(12) United States Patent
Vasic et al.

(10) Patent No.: US 12,143,408 B2
(45) Date of Patent: Nov. 12, 2024

(54) SEMI-SUPERVISED FRAMEWORK FOR PURPOSE-ORIENTED ANOMALY DETECTION

(71) Applicant: Oracle International Corporation, Redwood Shores, CA (US)

(72) Inventors: Milos Vasic, Zurchi (CH); Saeid Allahdadian, Vancouver (CA); Matteo Casserini, Zurich (CH); Felix Schmidt, Baden-Dattwil (CH); Andrew Brownsword, Vancover (CA)

(73) Assignee: Oracle International Corporation, Campbell, CA (US)

( * ) Notice: Subject to any disclaimer, the term of this patent is extended or adjusted under 35 U.S.C. 154(b) by 167 days.

(21) Appl. No.: 17/739,968

(22) Filed: May 9, 2022

(65) Prior Publication Data

US 2023/0362180 A1 Nov. 9, 2023

(51) Int. Cl.
*H04L 9/40* (2022.01)
*G06N 20/20* (2019.01)

(52) U.S. Cl.
CPC ......... *H04L 63/1425* (2013.01); *G06N 20/20* (2019.01)

(58) Field of Classification Search
None
See application file for complete search history.

(56) References Cited

U.S. PATENT DOCUMENTS

| | | | |
|---|---|---|---|
| 9,922,190 B2* | 3/2018 | Antonakakis | H04L 63/14 |
| 2017/0169360 A1* | 6/2017 | Veeramachaneni | G06F 21/56 |
| 2019/0138938 A1* | 5/2019 | Vasseur | H04L 41/147 |
| 2020/0394557 A1* | 12/2020 | Boult | G06F 16/285 |
| 2021/0157914 A1* | 5/2021 | Gauthier | G06N 20/20 |
| 2022/0391724 A1* | 12/2022 | Yoon | G06N 5/04 |

OTHER PUBLICATIONS

Odiathevar, Murugaraj, et al., "A Hybrid Online Offline System for Network Anomaly Detection", XP33620543, Jul. 29, 2019, 9pgs.
Mu, Xin, et al., "Classification under Streaming Emerging New Classes: a Solution using Completely Random Trees", Arxiv.Org, XP80704415, May 30, 2016, 37pgs.

* cited by examiner

*Primary Examiner* — Trang T Doan
(74) *Attorney, Agent, or Firm* — Hickman Becker Bingham Ledesma LLP (57) ABSTRACT

Techniques for implementing a semi-supervised framework for purpose-oriented anomaly detection are provided. In one technique, a data item in inputted into an unsupervised anomaly detection model, which generates first output. Based on the first output, it is determined whether the data item represents an anomaly. In response to determining that the data item represents an anomaly, the data item is inputted into a supervised classification model, which generates second output that indicates whether the data item is unknown. In response to determining that the data item is unknown, a training instance is generated based on the data item. The supervised classification model is updated based on the training instance.

19 Claims, 8 Drawing Sheets

SEMI-SUPERVISED FRAMEWORK FOR PURPOSE-ORIENTED ANOMALY DETECTION

TECHNICAL FIELD

The present disclosure is generally related to anomaly detection and, more particularly, to a new framework for anomaly detection that involves both unsupervised and supervised machine learning techniques.

BACKGROUND

Machine learning-powered anomaly detection (AD) has been widely in use in recent years. AD is an important tool which deals with identification of unknown or rare items or events that raise suspicion by differing from the majority of the data. AD is applicable in many domains, such as health monitoring, detection of misconfigured systems, and cyber security, which may range from fraud detection to intrusion detection. Nonetheless, AD-based systems face significant obstacles.

As a usual practice in industry for detecting anomalies using machine learning models, data is separated into three sections, each being used in a particular phase. These phases are referred to as training, validation, and test. The data in the training phase is used to train the machine learning model. Then, the data in the validation phase is used to validate the trained machine learning model. The validation phase may also include the fine tuning of hyperparameters. During an inference phase, the trained machine learning AD model is applied over the test data to detect possible anomalies. While the train and validation phases are usually offline, the test data may be generated and captured in an online manner. This anomaly detection is referred as real-time anomaly detection.

The results that the anomaly detector creates are dependent on the machine learning (ML) model architecture, hyperparameters, and the training data upon which the anomaly detector is trained. This means that an ML-based AD model learns the dominant behaviors and distributions it has seen from the training data. During inference, an anomaly score for an input sample is essentially the residual of misfitting the input sample inside the distributions the ML model has learnt. This has advantages and disadvantages.

One important advantage over the classic rule-based AD algorithms is that the ML model is more generic and independent of events seen before. In other words, the ML model can detect events which are similar or different from previously seen events, which are not necessarily identical. However, there are also two disadvantages that are present of using such models. One important shortcoming is that the inherent system of many applications in practice are dynamic and not completely fixed in time. This will result in the temporal shift of the data and hence mismatching to the normal training data seen during the training phase. This shift causes false positives, which is referred to as "concept drift." Concept drift is detected through manual grading that produces accuracy measures that indicate poor model performance. One possible approach to address concept drift is to take the AD model offline, gather new data for a period of time (e.g., a week), and train a new model on the newly gathered data. During this transition, either there is no AD system or the old, deficient AD model is being used. Another possible approach for handing false positives it to report less positives overall, but this approach increases the probability of not being alerted by true positives, or anomalies that should be investigated.

Another disadvantage of ML-based AD models is that the ML model, during inference, identifies any difference of a data sample to the training data as anomalous. This means that the AD model is blind to the actual application (or purpose) of the anomaly detection. The AD model only sees the numbers and distributions in a statistical way. If the input data is not fine-tuned enough to exclude the irrelevant features (or it is not possible to do so as is the case in many applications), then the anomalies could be completely irrelevant to the main purpose of the AD system. As an example, an anomaly detector built for the purpose of security intrusion detection might identify an irregular maintenance activity or updating of the system as anomalous. In another example, an anomaly detector to identify black spots on pictures of apples might identify rare cases of dirt on some apples as anomalous. This will result in false positives as the actual purpose is identification of black spots and not dirt on apples. Therefore, although the anomaly detector is doing the right thing based on what it has been trained on (the apples with dirt on them are statistically rare), its accuracy for its intended purpose (identifying black spots) is affected.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for purpose-oriented, semi-supervised anomaly detection framework are provided. In one technique, the framework uses manual gradings to train a supervised classification model that resides "on top" of an unsupervised anomaly detection (AD) model. The supervised model is trained based on the feedback of graders (or specialists) and, therefore, classifies the output results of the unsupervised AD model (or simply "anomaly detector") in a way that the final reported anomalies would be of higher importance and more relevant to the main purpose for which the anomaly detector was established. Such a framework learns the feedback from the graders and, by looking at the input and output of the anomaly detector, is able to classify the outputs in a way that the results would be oriented towards the interest of the specialists. In this way, the second disadvantage of prior AD systems not being purpose-oriented is addressed. In case of occurrence of a concept drift, the grades help in training the supervised model in a way that the noisy outputs from the anomaly detector are modified and diminished by the supervised model. Therefore, the semi-supervised framework has a positive effect on coping with concept drift. Furthermore, the semi-supervised framework calculates statistical uncertainty factors for each output and selects the outputs that are most beneficial to be graded. The benefit is evaluated based on the effectiveness of samples to fine-tune the supervised model and/or to reduce the number of reported final false positives.

In a typical AD system, however, the samples to be graded are chosen randomly (or in a stratified approach) which does not result in the most efficient overall outcome. These gradings are usually manual and are the most expensive step of the AD system. Therefore, taking advantage of them has a high impact on the efficiency of the overall AD system. Given that these graded data points are already evaluated, the extra cost of grading for the supervised classification model is zero. In addition, a computationally inexpensive algorithm for training and retraining the supervised classification model may be chosen to make the added inference impact of the supervised model minimal.

Therefore, embodiments described herein improve computer technology, namely, AD systems that have traditionally suffered from concept drift and being not purpose-oriented. Embodiments described herein comprise a purpose-oriented framework that addresses these two shortcomings of ML-based anomaly detectors. Such embodiments increase the accuracy of the overall AD system, reduce the need to train the unsupervised portion of the AD system as frequently, and take advantage of the inherent cost of manual grading.

System Overview

Figure 1:
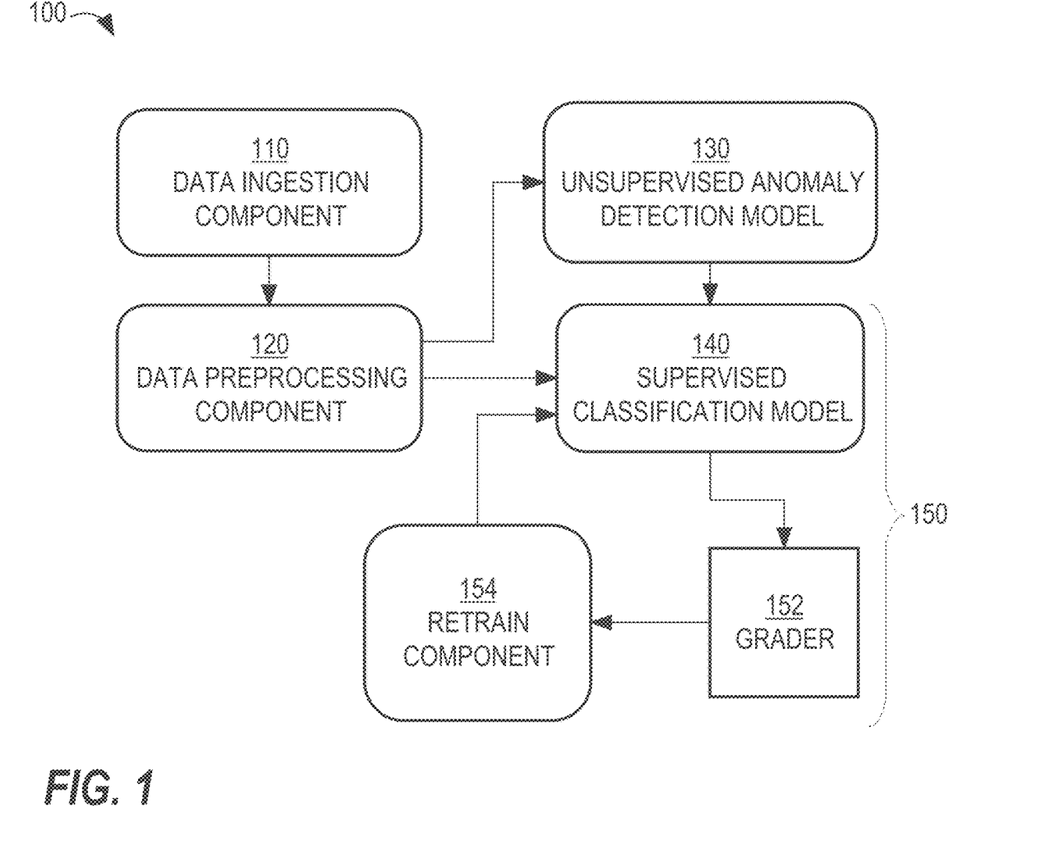
FIG. 1 is a block diagram that depicts an example system for detecting anomalies, in an embodiment.

FIG. 1 is a block diagram that depicts an example system 100 for detecting anomalies, in an embodiment. Embodiments are not limited to the types of data or anomalies that are detected. System 100 includes a data ingestion component 110, a data preprocessing component 120, an unsupervised anomaly detection (AD) model 130, and a supervised classification model 140. Each of data ingestion component 110 and data preprocessing component 120 may be implemented in software, hardware, or any combination of software and hardware.

Data ingestion component 110 receives data from one or more data sources, such as computer activity logs, transaction logs, audit histories, database logs, application logs, etc. Data preprocessing component 120 processes the received data to generate data items, each of which is inputted into unsupervised AD model 130, which generates an output for each input data item. The input data items may be in the same (or similar) form as the training instances upon which unsupervised AD model 130 was trained.

Unsupervised machine learning is a type of algorithm that learns patterns from untagged (or unlabeled) data. Through mimicry, which is an important mode of learning in people, the algorithm builds a compact internal representation of the training data. In contrast to supervised learning where data is tagged (or labeled) by an expert, unsupervised learning exhibits self-organization that captures patterns as probability densities or a combination of neural feature preferences. Two broad methods in unsupervised machine learning are neural networks and probabilistic methods.

Each training instance in (untagged) training data that is used to train unsupervised AD model 130 is generated from a data sample and comprises a feature vector of one or more feature values. One or more feature generation techniques may be used to generate a feature vector for a training instance. For example, one feature generation technique may be to count a number of words or tokens in a data sample, while another feature generation technique may be to compute a difference in (1) a first time indicated in one data sample pertaining to a particular user and (2) a second time indicated in another data sample pertaining to the particular user.

Examples of unsupervised machine learning techniques that may be used to train unsupervised AD model 130 include auto-encoding, isolation forests, principal component analysis, and any reconstructive ML model.

For each input data item (that comprises a feature vector similar to a training instance) that data preprocessing component 120 generates, unsupervised AD model 130 generates an output that is used to determine whether the input data item represents an anomaly. An output may comprise a statistical measure that indicates how similar the input data item is to distributions learned from training data upon which unsupervised AD model 130 was trained.

System 100 is a "semi-supervised" framework because system 100 also comprises supervised classification model 140, which is mounted "on top of" unsupervised AD model 130. This means that supervised classification model 140 receives, as input, output from unsupervised AD model 130 and makes anomaly detection decisions based on that output.

Examples of supervised machine learning techniques that may be used to train supervised classification model 140 include a k-nearest neighbor (kNN) algorithm, a support vector machine (SVM), and a neural network. An advantage of kNN is that the time required to train/retrain a kNN model is relatively low. Unlike more complex classification models, a kNN-based model does not need a significant number of labeled training data. Instead, its utility can be observed with relatively few labeled training instances.

Training data for supervised classification model 140 comprises multiple training instances, each training instance corresponding to a data sample and comprising a feature vector and a label. The feature vector may be similar to (or the same as) the feature vector (of the corresponding data item) that was input to unsupervised AD model 130. A grader provides input for the label. Examples of labels include relevant and irrelevant.

Supervised classification model 140 generates at least three possible output classes: unknown, relevant, and irrelevant. The relevant and irrelevant classes may be considered subclasses of a known class that is opposite of the unknown class. If an input data item is classified as relevant, then supervised classification model 140 (or another component, not depicted, of system 100) generates an alert or notification that is sent to an administrator or user of system 100. Examples of notifications include an SMS text message, an email message, and a software application notification. Each alert or notification may include a link that, if selected by a user, causes details about the input data item to be presented, such as when the data (from which the input data item was generated) was received at a data source or originally generated, system identification data that identifies which system the data originated, and geographic identification data that identifies where the data originated. If a user/administrator later determines that the input data item is irrelevant, then a training instance may be automatically generated and later used to retrain supervised classification model 140.

If supervised classification model 140 classifies an input data item as irrelevant, then no alert or notification is generated. Thus, such an input data item may be ignored. However, a subset of input data items that have been classified as irrelevant may still be manually graded later in order to generate an accuracy measure of supervised classification model 140 or system 100 as a whole and/or to generate new training instances if it turns out that, upon manual inspection, any irrelevant input data items are, in fact, relevant.

Initially, before there is training data for supervised classification model 140, supervised classification model 140 may classify every input data item that it receives from unsupervised AD model 130 as unknown. Thus, at least some input data items to supervised classification model 140 in this initial state will eventually be manually graded and, thus, become training instances to train supervised classification model 140.

Feedback Loop

System 100 also includes a feedback loop 150 that comprises supervised classification model 140, a grader 152, and a retrain component 154. Although feedback loop 150 includes a single grader 152, feedback loop 150 may comprise multiple graders, each operating different computing devices. Feedback loop 150 is based on an active sampling algorithm that samples input data items (or "query points") based on whether an input data item is classified by supervised classification model 140 as an unknown (or doubt) class. (Other possible classifications include a relevant class and an irrelevant class.) If supervised classification model 140 classifies an input data item as unknown, then the input data item is a candidate for one of graders 152 to manually investigate and grade as relevant or irrelevant. A benefit of feedback loop 150 is the significant reduction in the number of false positives.

If supervised classification model 140 classifies an input data item as unknown, then supervised classification model 140 stores, in association with the input data item, an unknown label that indicates that the input data item is assigned to the unknown class. Supervised classification model 140 (or another component, not depicted, of feedback loop 150) may cause the input data item to be stored in a certain storage location or may cause the input data item to be sent to another network or computing device. A computing device of grader 152 may (a) be notified of the specific input data item or of a set of input data items that is associated with the unknown class or (b) periodically retrieve a set of input data items for retraining supervised classification model 140.

Once grader 152 becomes notified of an input data item that is associated with the unknown class, grader 152 may investigate the input data item to determine whether it represents an anomaly or not. If the former, then grader 152 labels the input data item as relevant; otherwise, grader 152 labels the input data item as irrelevant. The labeled input data item then becomes a training instance to be used the next time supervised classification model 140 is trained.

The quality of grading has a direct impact on the accuracy of supervised classification model 140. Having more graded data samples with good quality reduces the effect that incorrect gradings (and the noise possibly present in them) have on supervised classification model 140.

Retrain component 154 retrains supervised classification model 140 based on training instances that are generated based on labels from grader 152 and any other graders (not depicted). Retrain component 154 may be implemented in software, hardware, or any combination of software and hardware. Retrain component 154 may be triggered to retrain supervised classification model 140 manually or automatically in response to one or more triggering criteria being satisfied. For example, after determining/detecting that ten new training instances have been generated, retrain component 154 retrains supervised classification model 140. As another example, retrain component 154 retrains the model every day, as long as there is at least one training instance. While being retrained, the current version of supervised classification model 140 may still operate, classifying input data items that unsupervised AD model 130 detected as possibly anomalous. Once an updated version of supervised classification model 140 is available after retraining is complete, then the updated version replaces the current version in production. Thereafter, input data items that are detected as possibly anomalous are then input to the updated version.

In an embodiment, the success of supervised classification model 140 is linked to the anomaly threshold of unsupervised AD model 130. For example, if relatively few input data items to supervised classification model 140 are classified as unknown, then an anomaly threshold of unsupervised AD model 130 is adjusted downward, increasing the likelihood that unsupervised AD model 130 identifies a future input data item as possibly anomalous.

Details of an Example Supervised Classification Model

Figure 2A:
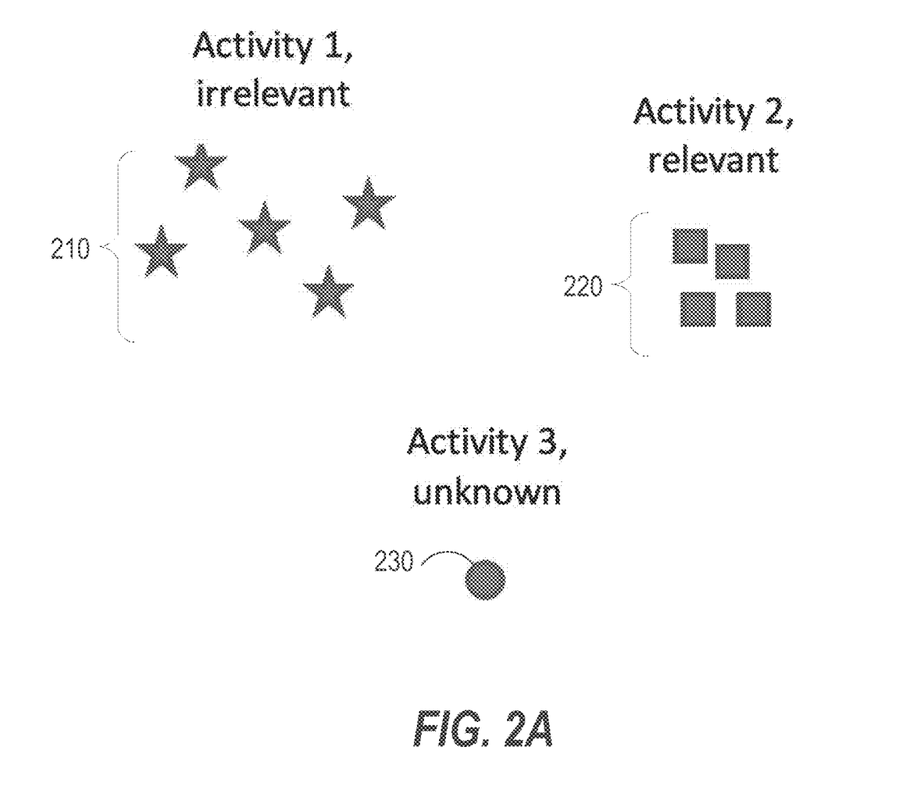
FIG. 2A depicts example classes for illustration purposes.

A role of supervised classification model 140 is to classify activities into relevant and irrelevant for the application at hand by using the knowledge learnt from supplied labels. For example, in the security application, a new program being installed and run on a monitored host may correspond to non-malicious activity. Supervised classification model 140 learns a decision boundary and classifies incoming points based on the distance from the decision boundary. Thus, supervised classification model 140 needs to account for yet unlabeled activities, which is done by introducing a doubt (or unknown) class. It would be incorrect to classify a new activity (or an activity very distant from all labeled activities) as either relevant or irrelevant. An example is provided in FIG. 2A, where a new activity 230 (corresponding to Activity 3) is distant from both clusters of Activity 1 210 and Activity 2 220. Therefore, new activity 230 should be classified as unknown (i.e., assigned the unknown/doubt class).

In an embodiment, supervised classification model 140 includes two confidence measures: a confidence that an input data item (or query point) is an inlier and a confidence of supervised classification model 140 of its decision. A threshold is set on each of the two confidence measures. Each threshold serves as a rejection criterion. Violating either confidence threshold results in assigning an unknown class to an input data item.

Figure 2B:
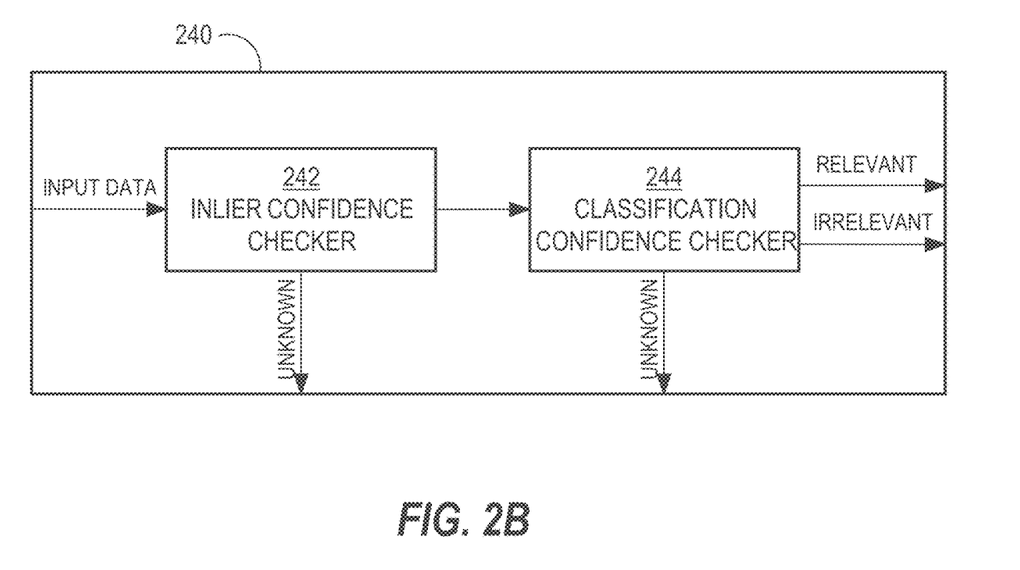
FIG. 2B is a block diagram that depicts components of an example classifier for classifying potential anomalies, in an embodiment.

FIG. 2B is a block diagram that depicts an example supervised classification model 240, in an embodiment. Model 240 includes an inlier confidence checker 242 and a classification confidence checker 244. An input data item is input to inlier confidence checker 242 (e.g., after unsupervised AD model 130 classifies the input data item as possibly or potentially anomalous). Inlier confidence checker 242 computes an inlier confidence measure (or score) for the for the input data item and compares that measure to an inlier confidence threshold. If the inlier confidence measure of the input data item does not exceed the inlier confidence threshold, then inlier confidence checker 242 classifies the input data item as unknown (or assigns the unknown class to the input data item).

If the inlier confidence measure of the input data item exceeds the inlier confidence threshold, then classification confidence checker 244 computes a classification confidence measure (or score) for the input data item and compares that measure to a classification confidence threshold. If the measure does not exceed the classification confidence threshold, then classification confidence checker 244 classifies the input data item as unknown. Otherwise, classification confidence checker 244 classifies the input data item as relevant or irrelevant. Values for the different confidence thresholds may be inferred during a training of supervised classification model 140 using cross validation. In other words, the different confidence thresholds are hyperparameters. Another hyperparameter of supervised classification model 140 may be k, the number of nearest neighbors, in an embodiment where kNN is used.

In an embodiment, the inlier confidence measure (or score) of an input data item is estimated from the cumulative density function (CDF) of mean distances to k nearest neighbors for each data item (or query point) in the training set. In other words, for each labeled query point $x_i$ in the training set T, regardless of its class, the mean distance ($\bar{d}_i$) to its k nearest neighbors $y_j$ is computed:

$$\bar{d}_i = \frac{1}{k}\sum_{j=1}^{k} d(x_i, y_j)$$

where d is a distance measure. The CDF of $\bar{d}_i$ is then computed, $\forall x_i \epsilon T$ The CDF is a function learned during training. During inference, the mean distance (m) of the input data item (or query point) to its k nearest neighbors is computed first, and then a value (n) of the CDF in m is computed (e.g., n=CDF(m)), and then n is compared to the inlier confidence threshold. If this value n is less than the inlier confidence threshold, then the input data item is assigned the unknown class. This approach provides a consistent distance threshold across different training sets, space dimensionalities or distance measures, and helps effectively diminish the effect of outlier labels.

Figure 2C:
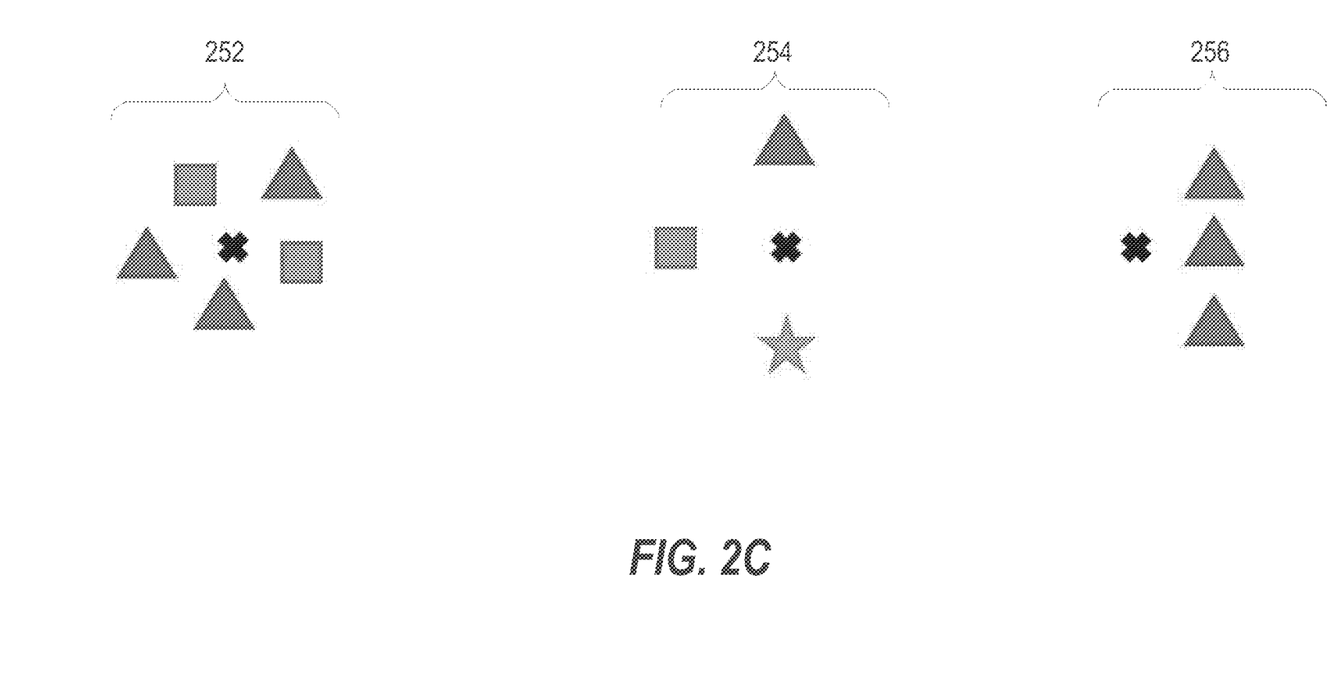
FIG. 2C depicts example classification outcomes, in an embodiment.

In an embodiment, the classification confidence measure (or score) of an input data item is obtained from the a posteriori probability of class $w_i$ given point x:

$$P(w_i \mid x) = \frac{\sum_{j \epsilon s_i} \frac{1}{d(x, y_j) + \epsilon}}{\sum_{j=1}^{k} \frac{1}{d(x, y_j) + \epsilon}}$$

where d is the used distance measure, $s_i$ is the set of indices of training points of class $w_i$ among the k nearest neighbors $y_1, \ldots, y_k$ of point x, and $\epsilon$ is a small constant added for numerical stability purposes. Thus, neighbors are weighted by their inverse distance to the input data item. A few examples are illustrated in FIG. 2C, where the input data item is denoted using a black X symbol. Labeled data items (or training instances) are represented as triangles, squares, and stars. For illustration purposes, it is assumed that the query point has the same distance to all of its k nearest neighbors. In example 252, for k=5 $P(w_{triangle}|X)$=0.6 and $P(w_{square}|X)$=0.4. In example 254, for k=3, each class has the same probability of 1/3. In example 256, for k=3 $P(w_{triangle}|x)$=1.

Figure 2D:
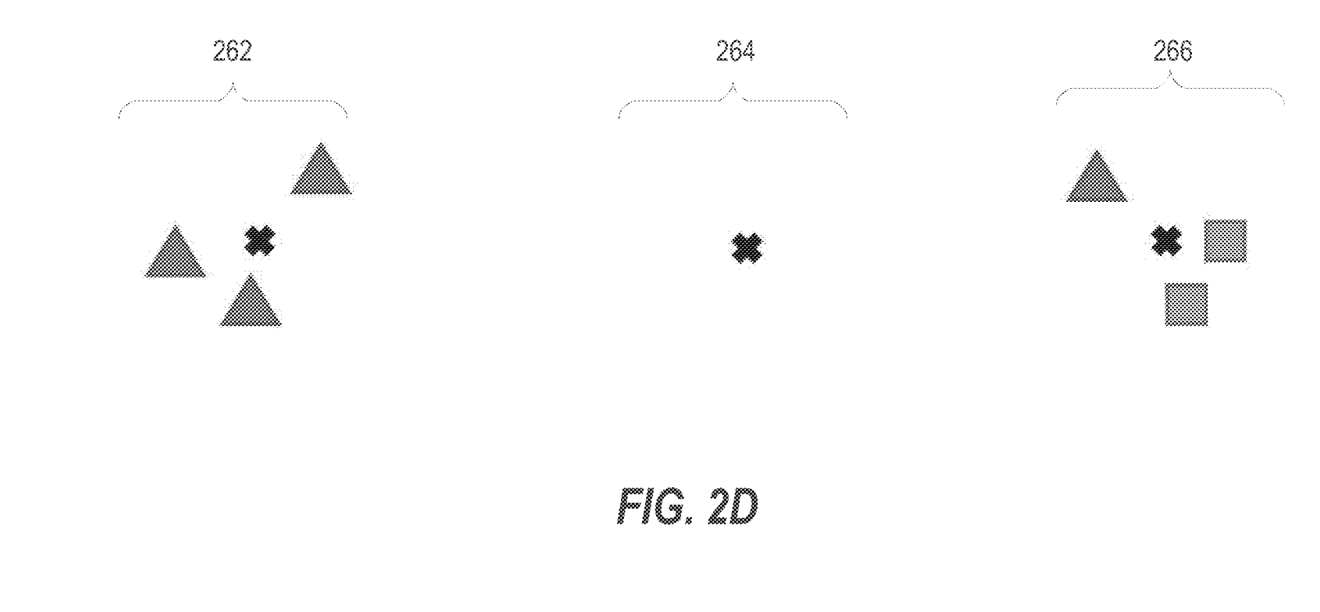
FIG. 2D depicts additional example classification outcomes, in an embodiment.

FIG. 2D depicts additional example classification outcomes, in an embodiment. In example 262, an input data item would pass inlier confidence checker 242 and, thus, be considered an inlier and, eventually, classification confidence checker 244 would assign the input data item to the triangle class since there are no other labeled classes near the input data item in the training set.

In example 264, inlier confidence checker 242 would generate an inlier confidence measure that is below the inlier confidence threshold because there are no labeled data points near the input data item. Thus, the input data item would be assigned the unknown class.

In example 266, inlier confidence checker 242 would generate an inlier confidence measure that exceeds the inlier confidence threshold because there are labeled data points near the input data item. However, classification confidence checker 244 would generate a classification confidence measure that does not exceed the classification confidence threshold because there is ambiguity arising from the proximity of the input data item to differently labeled training instances.

The active feedback loop 150 between the supervised classification model 140 and grader 152 ensures that new labels are collected in a way that improves model performance in areas with low confidence. If there are more unknown data items than there is a budget for to manually grade, then one or more sampling approaches may be used. In one sampling approach, anomalies may be sampled from a pool of anomalies classified as unknown as follows: $N_1$ data items are sampled from input data items rejected based on the inlier confidence threshold (sub-pool A) and $N_2$ data items are sampled from input data items rejected based on the classification confidence threshold (sub-pool B), where both $N_1$ and $N_2$ are model hyperparameters and $N_1+N_2$ equal the total grading budget.

One sub-sampling approach is to take top $N_1$ unknown anomalies and the top $N_2$ unknown anomalies from each sub-pool. In other words, $N_1$ data items with the largest $d_i$ are sampled from sub-pool A and $N_2$ data items with the lowest dominant POO are sampled from sub-pool B. Alternatively, a probabilistic sampling method may be used to sample unknown anomalies from each pool.

Process Overview

Figure 3:
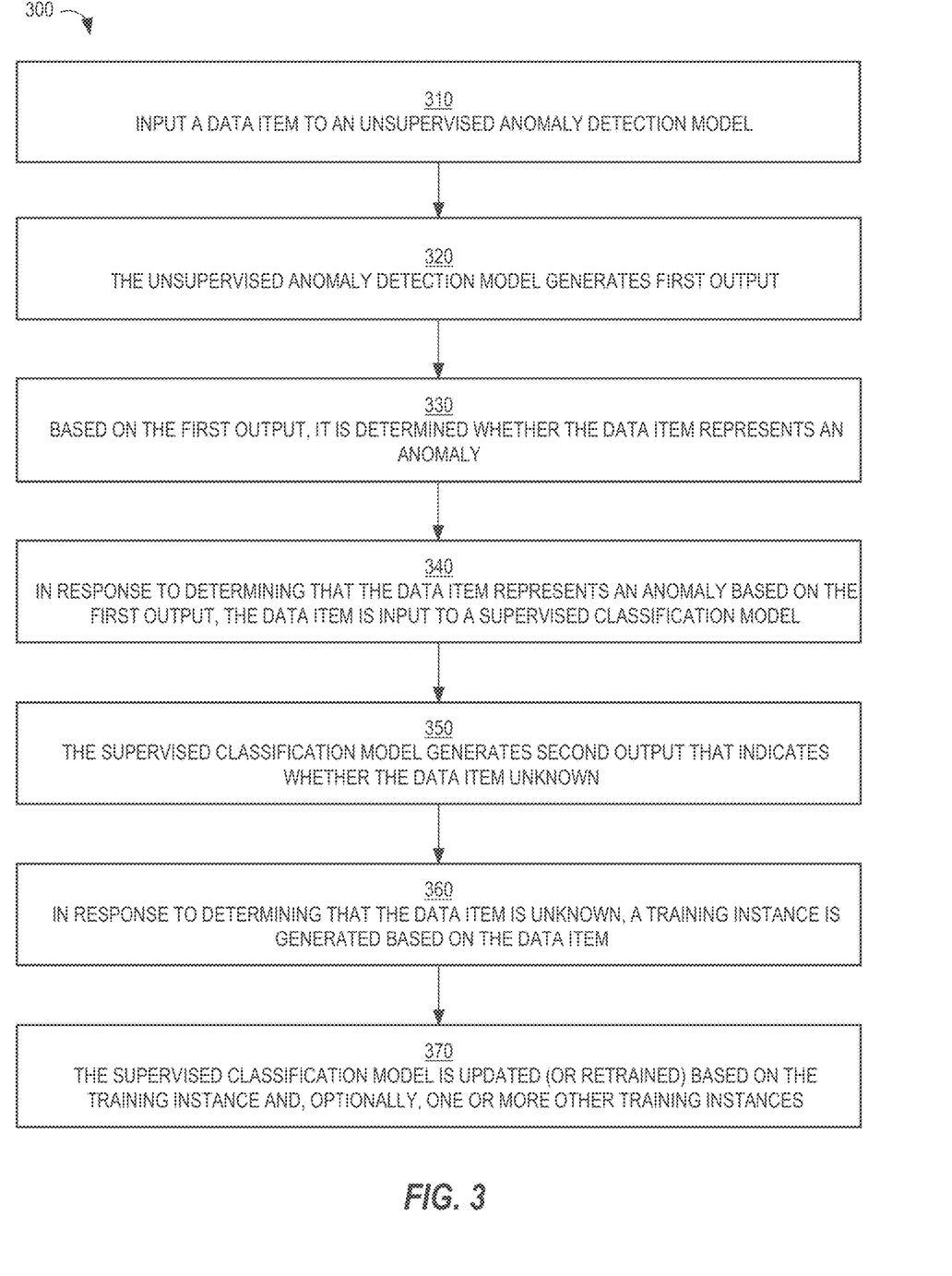
FIG. 3 is a flow diagram that depicts an example process for detecting anomalies, in an embodiment.

FIG. 3 is a flow diagram that depicts an example process 300 for detecting anomalies, in an embodiment. Process 300 may be implemented by different components of system 100.

At block 310, a data item is input to an unsupervised anomaly detection model. The data item may originate from one of multiple data sources. Thus, in one iteration of block 310, a data item may come from one data source and in another iteration of block 310, a data item may come from another data source. Block 310 may involve a software process invoking the unsupervised AD model and passing the data item as input to the model. Block 310 may be preceded by one or more feature generation techniques that generates the data item so that the data item is in a form that is recognizable and processable by the unsupervised AD model.

At block 320, the unsupervised anomaly detection model generates first output. The first output may be a statistical measure that indicates how anomalous the data item is.

At block 330, based on the first output, it is determined whether the data item represents an anomaly. If the statistical measure of the data item is above a certain threshold, then the data item is considered anomalous; otherwise, the data item is not considered anomalous. The certain threshold may be selected during the validation phase to increase accuracy, precision, and/or recall and/or reduce the number of false positives made and/or the number of false negatives made during the validation phase. For example, the threshold may be selected such that there are no false negatives in the validation data set.

At block 340, in response to determining that the data item represents an anomaly based on the first output, the data item is input to a supervised classification model. The same process that invoked the unsupervised AD model with the data item as input may invoke the supervised classification model with the data item as input.

At block 350, the supervised classification model generates second output that indicates whether the data item is unknown. For example, in the case of a kNN classification model, block 350 may involve an inlier confidence checker determining that the data item is an outlier and, therefore, unknown. Alternatively, block 350 may involve a classification confidence checker determining that the data item is relatively close (e.g., in multi-dimensional space) to training instances of differing classes (e.g., relevant and irrelevant) and, therefore, the data item is assigned the unknown class.

At block 360, in response to determining that the data item is unknown, a training instance is generated based on the data item. Block 360 may be performed after a user or administrator investigates the data item to manually determine whether the data item represents an anomaly. Either way, the user or administrator provides, to a computing device, input that indicates whether the data item is, in fact, anomalous. Based on this label input, the training instance is automatically generated.

At block 370, the supervised classification model is updated (or retrained) based on the training instance and, optionally, one or more other training instances corresponding to input data items that supervised classification model 140 previously classified as unknown, but have since been manually labeled. Block 370 may be performed after blocks 310-360 are performed multiple times, each for a different input data item. For example, block 370 might be performed hourly or daily or after ten performances of block 360. Also, some invocations of blocks 310-330 might not result in a possible anomaly detection. Thus, blocks 340-360 might not be performed as much as blocks 310-330. Similarly, block 360 might not be performed as much as block 350, since there may be many instances where a data item is classified as known (e.g., relevant or irrelevant).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
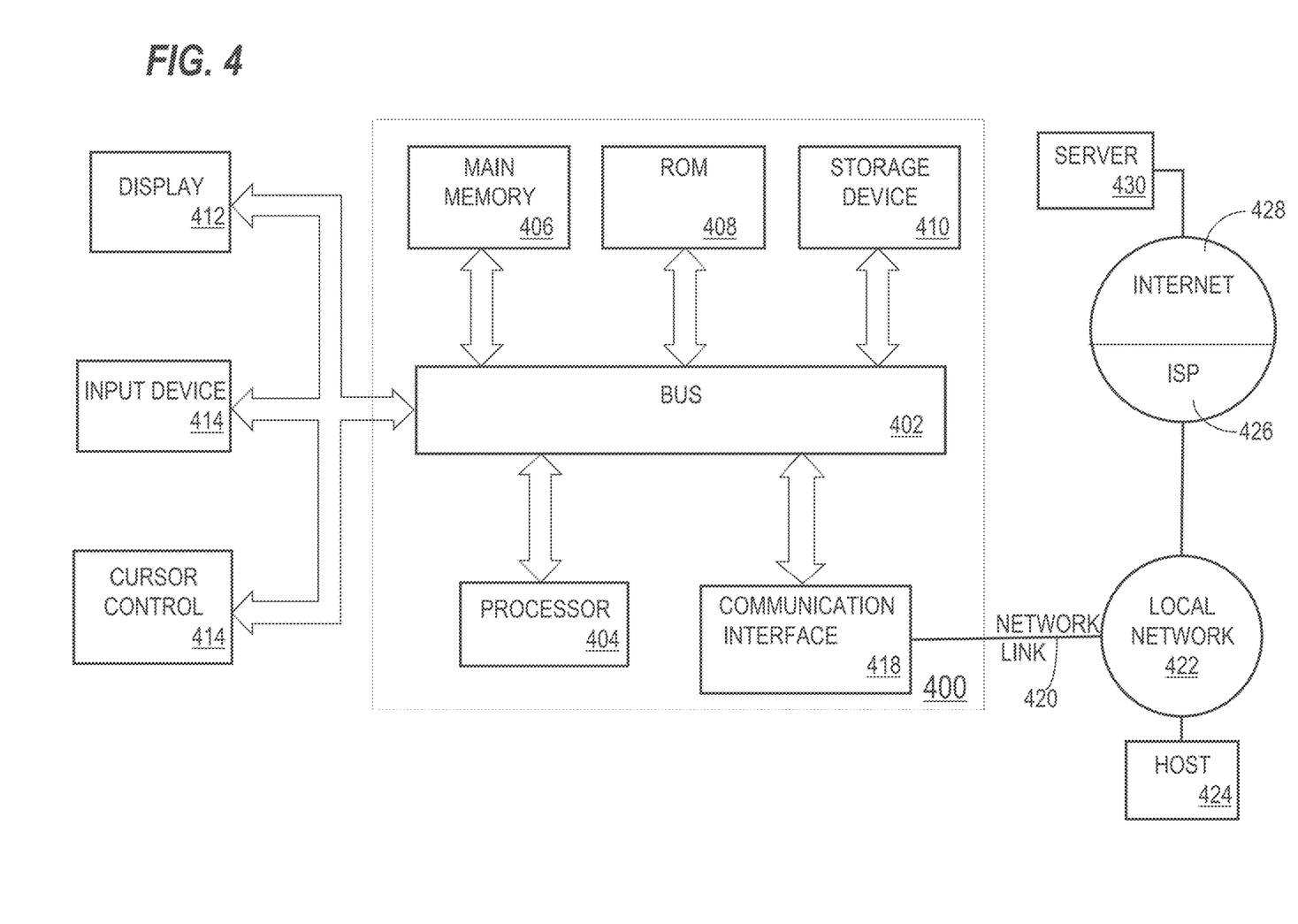
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
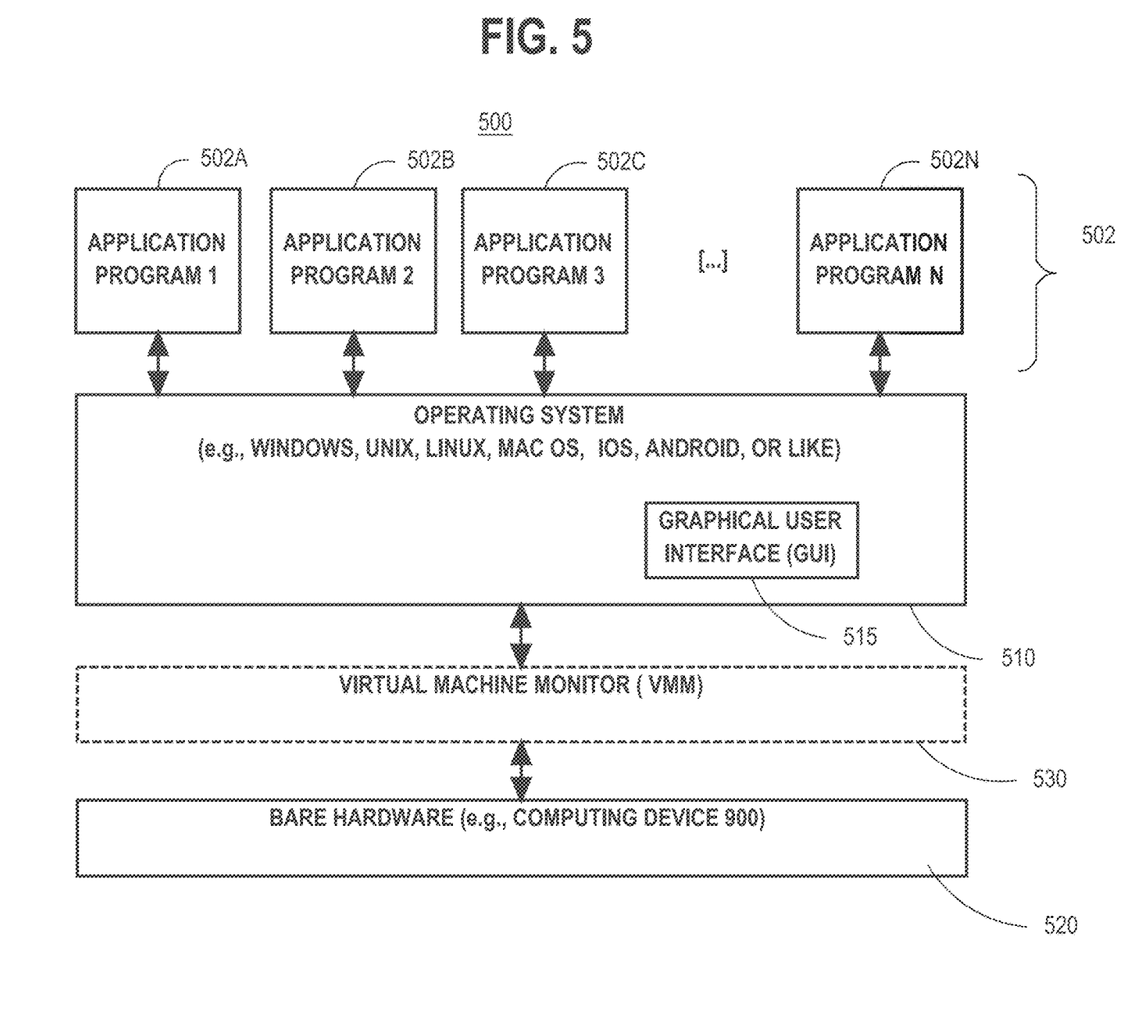
FIG. 5 is a block diagram of a basic software system that may be employed for controlling the operation of the computer system.

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   inputting a data item to an unsupervised anomaly detection model;
   generating, by the unsupervised anomaly detection model, first output;
   determining, based on the first output, whether the data item represents an anomaly;
   in response to determining that the data item represents an anomaly, inputting the data item to a supervised classification model;
   generating, by the supervised classification model, second output that indicates whether the data item is unknown;
   in response to determining that the data item is unknown, generating a training instance based on the data item;
   updating the supervised classification model based on the training instance;
   in response to determining that a second data item represents an anomaly, inputting the second data item to the supervised classification model;

generating, by the supervised classification model, third output that indicates whether the second data item is relevant or irrelevant;

in response to determining that the second data item is relevant, generating and storing an alert;

wherein the method is performed by one or more computing devices.

2. The method of claim 1, further comprising:

in response to determining that a third data item represents an anomaly, inputting the third data item to the supervised classification model;

generating, by the supervised classification model, fourth output that indicates whether the third data item is relevant or irrelevant;

in response to determining that the third data item is irrelevant, ignoring the third data item.

3. The method of claim 1, further comprising:

computing, by the supervised classification model, an inlier confidence score for the data item;

performing a comparison between the inlier confidence score and an inlier confidence threshold;

based on the comparison, determining that the data item is unknown.

4. The method of claim 1, further comprising:

computing, by the supervised classification model, an inlier confidence score for the data item;

performing a first comparison between the inlier confidence score and an inlier confidence threshold;

based on the first comparison, computing, by the supervised classification model, a classification confidence score for the data item;

performing a second comparison between the classification confidence score and a classification confidence threshold;

based on the second comparison, determining that the data item is unknown.

5. The method of claim 1, further comprising:

using a k-nearest neighbor machine learning technique to train the supervised classification model.

6. The method of claim 1, further comprising:

based on a number of data items that the supervised classification model has classified as unknown, adjusting an anomaly threshold of the unsupervised anomaly detection model.

7. One or more non-transitory storage media storing instructions which, when executed by one or more computing devices, cause:

inputting a data item to an unsupervised anomaly detection model;

generating, by the unsupervised anomaly detection model, first output;

determining, based on the first output, whether the data item represents an anomaly;

in response to determining that the data item represents an anomaly, inputting the data item to a supervised classification model;

generating, by the supervised classification model, second output that indicates whether the data item is unknown;

computing, by the supervised classification model, an inlier confidence score for the data item;

performing a comparison between the inlier confidence score and an inlier confidence threshold;

based on the comparison, determining that the data item is unknown;

in response to determining that the data item is unknown, generating a training instance based on the data item;

updating the supervised classification model based on the training instance.

8. The one or more non-transitory storage media of claim 7, wherein the instructions, when executed by the one or more computing devices, further cause:

in response to determining that a second data item represents an anomaly, inputting the second data item to the supervised classification model;

generating, by the supervised classification model, third output that indicates whether the data item is relevant or irrelevant.

9. The one or more non-transitory storage media of claim 8, wherein the instructions, when executed by the one or more computing devices, further cause:

in response to determining that the second data item is irrelevant, ignoring the second data item.

10. The one or more non-transitory storage media of claim 8, wherein the instructions, when executed by the one or more computing devices, further cause:

in response to determining that the second data item is relevant, generating and storing an alert.

11. The one or more non-transitory storage media of claim 7, wherein the comparison is a first comparison, wherein the instructions, when executed by the one or more computing devices, further cause:

based on the first comparison, computing, by the supervised classification model, a classification confidence score for the data item;

performing a second comparison between the classification confidence score and a classification confidence threshold;

wherein determining that the data item is unknown is also based on the second comparison.

12. The one or more non-transitory storage media of claim 7, wherein the instructions, when executed by the one or more computing devices, further cause:

using a k-nearest neighbor machine learning technique to train the supervised classification model.

13. The one or more non-transitory storage media of claim 7, wherein the instructions, when executed by the one or more computing devices, further cause:

based on a number of data items that the supervised classification model has classified as unknown, adjusting an anomaly threshold of the unsupervised anomaly detection model.

14. The one or more non-transitory storage media of claim 7, wherein the instructions, when executed by the one or more computing devices, further cause:

sampling a first set of data items that were rejected based on the inlier confidence threshold;

sampling a second set of data items that were rejected based on the classification confidence threshold.

15. The one or more non-transitory storage media of claim 7, wherein the inlier confidence score for the data item is estimated from a cumulative density function (CDF) of mean distances to k nearest neighbors for each data item in a training set.

16. A system comprising:

one or more processors;

one or more non-transitory storage media storing instructions which, when executed by the one or more processors, cause:

inputting a data item to an unsupervised anomaly detection model;

generating, by the unsupervised anomaly detection model, first output;

determining, based on the first output, whether the data item represents an anomaly;

in response to determining that the data item represents an anomaly, inputting the data item to a supervised classification model;

generating, by the supervised classification model, second output that indicates whether the data item is unknown;

computing, by the supervised classification model, an inlier confidence score for the data item;

performing a first comparison between the inlier confidence score and an inlier confidence threshold;

based on the first comparison, computing, by the supervised classification model, a classification confidence score for the data item;

performing a second comparison between the classification confidence score and a classification confidence threshold;

based on the second comparison, determining that the data item is unknown;

in response to determining that the data item is unknown, generating a training instance based on the data item;

updating the supervised classification model based on the training instance.

17. The system of claim 16, wherein the instructions, when executed by the one or more processors, further cause:
in response to determining that a second data item represents an anomaly, inputting the second data item to the supervised classification model;
generating, by the supervised classification model, third output that indicates whether the data item is relevant or irrelevant.

18. The system of claim 17, wherein the instructions, when executed by the one or more processors, further cause:
in response to determining that the second data item is irrelevant, ignoring the second data item.

19. The system of claim 17, wherein the instructions, when executed by the one or more processors, further cause:
in response to determining that the second data item is relevant, generating and storing an alert.

* * * * *

UNITED STATES PATENT AND TRADEMARK OFFICE
CERTIFICATE OF CORRECTION

| | | |
|---|---|---|
| PATENT NO. | : 12,143,408 B2 | Page 1 of 1 |
| APPLICATION NO. | : 17/739968 | |
| DATED | : November 12, 2024 | |
| INVENTOR(S) | : Vasic et al. | |

It is certified that error appears in the above-identified patent and that said Letters Patent is hereby corrected as shown below:

In the Specification

In Column 2, Line 43, delete "embodiment." and insert -- embodiment; --, therefor.

In Column 7, Line 53, delete "$\forall x_i \in T$" and insert -- $\forall x_i \in T.$ --, therefor.

In Column 7, Line 66, delete "the a" and insert -- the --, therefor.

Signed and Sealed this
Eleventh Day of February, 2025

Coke Morgan Stewart
*Acting Director of the United States Patent and Trademark Office*